US 6,728,397 B2

(12) United States Patent
McNeal (10) Patent No.: US 6,728,397 B2
(45) Date of Patent: *Apr. 27, 2004

(54) CHECK VERIFICATION SYSTEM (76) Inventor: Joan Tibor McNeal, P.O. Box 278, Waycross, GA (US) 31502

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,649

(22) Filed: Jun. 18, 1999

(65) Prior Publication Data
US 2003/0128866 A1 Jul. 10, 2003

Related U.S. Application Data (60) Provisional application No. 60/089,959, filed on Jun. 19, 1998.

(51) Int. Cl.[7] .................................................. G06K 9/00
(52) U.S. Cl. ......................................... 382/137; 765/45
(58) Field of Search ................................ 382/124, 115, 382/118, 224, 181, 137, 138, 139, 140, 141; 380/251; 713/186, 181; 235/380, 379, 494; 705/45, 75

(56) References Cited

U.S. PATENT DOCUMENTS

| 4,048,618 A | * | 9/1977 | Hendry .......................... 382/124 |
| 4,213,038 A | * | 7/1980 | Silverman et al. ........... 235/382 |
| 4,253,086 A | | 2/1981 | Szwarcbier ........... 340/146.3 E |
| 4,582,985 A | | 4/1986 | Löfberg ....................... 235/380 |
| 4,947,443 A | | 8/1990 | Costello .......................... 382/5 |
| 4,993,068 A | * | 2/1991 | Piosenka et al. ............. 713/186 |
| 4,995,086 A | | 2/1991 | Lilley et al. .................... 382/4 |
| 5,180,901 A | | 1/1993 | Hiramatsu ................... 235/380 |
| 5,321,765 A | | 6/1994 | Costello .......................... 382/4 |
| 5,444,794 A | * | 8/1995 | Uhland, Sr. .................... 705/45 |
| 5,484,988 A | | 1/1996 | Hills et al. .................... 235/379 |
| 5,598,474 A | * | 1/1997 | Johnson ....................... 713/186 |
| 5,623,522 A | | 4/1997 | Ito .............................. 375/369 |

(List continued on next page.)

Primary Examiner—Jayanti K. Patel
Assistant Examiner—Seyed Azarian
(74) Attorney, Agent, or Firm—Womble Carlyle Sandridge & Rice, PLLC (57) ABSTRACT A verification system for negotiable instruments, such as checks, that gathers and transmits information about the negotiable instrument and biometric data. The system preferably has the ability to scan the magnetic number off of checks, digitally encode fingerprints, scan driver's licenses or other identification cards, and take a signature of a customer, all at a point of sale for purposes of fund verification. The check verification system preferably digitizes various indicia of the check, preferably the magnetic ink on the check, at the point of sale and transmits the check information data to a remotely located main system whereby the main system compares the inputted data with an existing database of information to determine if the customer at the point of sale is in fact authorized to use the account, and if the account is in satisfactory condition for check approval. The check verification system alternatively includes a biometric data device for recording and/or transmitting biometric data, such as the fingerprint of the customer, taken at the point of sale, and the device alternately prints the biometric data on the check, either in actual or digitally encoded form, such that the biometric data can be later checked against a database at the time the check is processed at a bank. The system alternately includes a device for scanning an information card which contains biometric data such as a proper fingerprint and/or a signature, and the remotely gathered data can alternatively be compared to the recorded data on the card, in addition to or instead of, transmission of the gathered data to the database(s).

25 Claims, 6 Drawing Sheets

U.S. PATENT DOCUMENTS

| | | | |
|---|---|---|---|
| 5,668,874 A | 9/1997 | Kristol et al. | 380/23 |
| 5,668,897 A | 9/1997 | Stolfo | 382/283 |
| 5,745,046 A | 4/1998 | Itsumi et al. | 340/825.31 |
| 5,748,780 A | 5/1998 | Stolfo | 382/232 |
| 5,764,789 A | 6/1998 | Pare, Jr. et al. | 382/115 |
| 5,774,879 A | 6/1998 | Custy et al. | 705/35 |
| 5,799,092 A | 8/1998 | Krostol et al. | 380/51 |
| 5,802,199 A | 9/1998 | Pare, Jr. et al. | 382/115 |
| 5,815,252 A | 9/1998 | Price-Francis | 356/71 |
| 5,815,598 A | 9/1998 | Hara et al. | 382/211 |
| 5,818,955 A | 10/1998 | Smithies et al. | 382/115 |
| 5,852,670 A | 12/1998 | Setlak et al. | 382/126 |
| 6,032,137 A * | 2/2000 | Ballard | 705/75 |
| 6,072,894 A * | 6/2000 | Payne | 382/118 |
| 6,091,835 A * | 7/2000 | Smithies et al. | 382/115 |

* cited by examiner

CHECK VERIFICATION SYSTEM

CROSS-REFERENCE TO RELATED APPLICATION

This application claims the benefit of U.S. Provisional Application No. 60/089,959, filed Jun. 19, 1998.

BACKGROUND OF THE INVENTION

1. Field of the Invention

The present invention generally relates to credit and identity verification systems. More particularly, the present invention relates to credit approval systems at the point of sale which utilize biometric data such as fingerprints, signatures, and/or other methods to ascertain if the identity of the person attempting to pay by a negotiable instrument, such as a check is an authorized person for that particular checking or credit account, and if that account is in order.

2. Description of the Related Art

There are devices known in the art which gather biometric data from persons for storage or for comparison with stored biometric data for purposes of identity verification. An example of storing biometric data for identity verification is U.S. Pat. No. 4,213,038 to Silverman, et al., for an access security system. Silverman, et al., discloses storing a fingerprint on a card, in either an actual print or "micropattern," and the card is read by a control means. The fingerprint recordation is ancillary to the preferred function of the card which is identification based upon solely the microperforation of the card, which is not directly related to the fingerprint.

Check funds verification systems are also known in the art which allow merchants and others to verify that customers have funds available in a specific checking account. U.S. Pat. No. 5,484,988 to Hills, et al, discloses a check-writing point of sale system that provides for remote verification of funds availability. Hills, et al., is particularly directed to the purchase of goods through an electronic funds transfer.

U.S. Pat. No. 4,253,086 to Szwarcbier discloses a process and apparatus for positive identification of customers that is particularly disclosed as using a fingerprint on a credit card and comparing the fingerprint of the customer to that on the card, and selectively, with a master print on file. Szwarcbier also discloses a printed fingerprint card.

There are "smart cards" known in the art which include fingerprint identification means, such as U.S. Pat. No. 4,995,086 to Lilley, et al., U.S. Pat. No. 4,582,985 to Löfberg, U.S. Pat. No. 4,993,068 to Piosenka, et al., and U.S. Pat. No. 5,180,901 to Hiramatsu. All of these references disclose smart cards which have, at least, a stored fingerprint in a local memory (such as magnetic tape or integrated circuit) which interacts with a reading means at the point of sale to assist in customer identification.

An example of an actual fingerprint sensor is U.S. Pat. No. 5,745,096 to Hsumi, et al., which is for a surface-shaped sensor identification device. The Hsumi, et al. device is focused on the specific element of sensing and recording the fingerprint, as opposed to a complete identity verification system.

SUMMARY OF THE INVENTION

The present invention, in one preferred embodiment thereof, comprises a verification system for negotiable instruments, preferably being checks, which has the ability to scan the information from checks such as the magnetic check number, and gather biometric data such as fingerprints. The system alternately scans driver's licenses or other identification cards, and obtains and transmits a signature of a customer, preferably all occurring at a point of sale, for purposes of identity and fund verification. The verification system preferably digitizes various indicia of the check, the preferred indicia being the magnetic ink on the check, tendered by the customer at the point of sale and transmits the data to a negotiable instrument information database, preferably through a modem or other dial-up connection, whereby the inputted data is compared with an existing database of information to determine if the customer at the point of sale is in fact authorized to use the account, and if the account is in satisfactory condition for check approval.

The verification system alternatively includes a device and method for recording and/or transmitting the fingerprint of the customer at the point of sale and printing the fingerprint on the check, either in actual or digitally encoded form, such that the fingerprint can be later checked against a biometric database of existing fingerprints at such time as the check is processed at a bank, which provides an added means of security in the event the check is returned. If the system includes a device for scanning an information card which contains biometric data, such as a proper fingerprint such as on a driver's license, and/or signature, then the fingerprint and signature of the customer can alternatively be compared to the recorded data on the card, in addition to or instead of, transmission of the various databases.

In an alternate embodiment of the verification system, a check is swiped and the fingerprint is simultaneously taken and digitized whereby the combined data is transmitted to a main system that includes a check information database and a biometric database, and the transmitted data is compared with identification data already on file, and the main system determines if the identification data of an authorized user on file matches with the transmitted data from the customer at the point of sale. The system then returns the results of the decision on approval to the point of sale. A device at the point of sale displays the decision data and/or prints out a hard copy indicating whether the check was approved or denied.

In operation, the main system receives data from the point of sale and then determines if the "ABA" magnetic number on the check is a valid number, if the fingerprint data is that of an account owner authorized to use that account, and/or if the signature is that of the authorized account owner, whereby any negative response to these decisions preferably causes return of the data indicative of the negative response to the point of sale. Upon affirmative indications in the decisions, the main system retrieves the frequency of the account accesses to determine if the current requested access is in excess of a pre-determined limit of an allowable number of accesses. If the current access is in excess of the pre-determined allowable limit, then the data is returned to the point of sale indicating the unacceptable request to exceed the limit, and thus, denial of approval. If the current access is not in excess of the allowable determined limit, then the verification of the check is approved and such verification is used to update the frequency of account access database, and the approval is returned to the point of sale.

The verification system preferably includes the capability to provide reports on customer activity to a retailer upon request. The retailer directs an inquiry to the main system which is in communication with a series of databases and which preferably includes databases indicative of: a number of checks cashed for a specific account; the location of the checks cashed for such account; and a customer list and relevant data associated with the customer. Depending upon the inquiry generated from the retailer, the main system retrieves the requested information to generate a report on a specific customer, and then returns the report to the retailer.

Alternatively, the verification system can be used in conjunction with a bank proofing machine during batch processing of checks. When the proofing machine scans the magnetic number from the check, the identification data imprinted on a check at the point of sale is compared with account owner identification data as recorded and maintained by the bank to determine if the correct account owner submitted the check.

Accordingly, the present invention has a practical application in that it provides a negotiable instrument verification system to a retailer for use at a point of sale which determines if the customer is authorized to use a specific account, and if the account is satisfactory to remit funds for the negotiable instrument drawn thereagainst.

The present invention of the verification system further has industrial applicability in that it provides a computer system which correlates biometric data that is precise and not easily forgeable measurements of a customer, such as fingerprints and/or data from identification cards can be digitally encoded and processed along with the information relative to a negotiable instrument such that the risk of the retailer accepting a bad check is greatly reduced. Thus, the present invention can be quite economically beneficial to a retailer utilizing the system.

Other objects, features, and advantages of the present invention will become apparent to one of skill in the art after review of the hereinafter set forth Brief Description of the Drawings, and Detailed Description of the Invention and the claims.

DETAILED DESCRIPTION OF THE INVENTION

Figure 1:
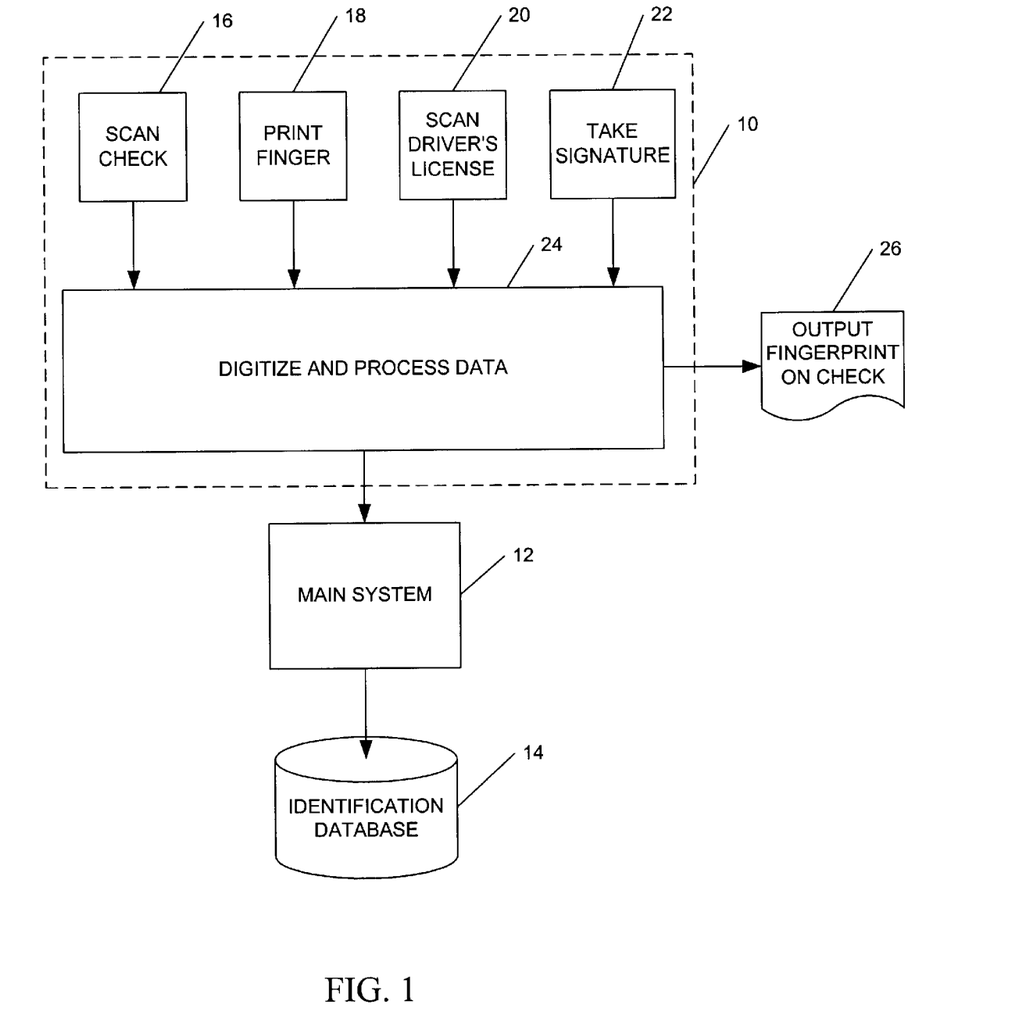
FIG. 1 is a block diagram of the preferred embodiment of the verification system illustrating a check verification unit in communication with a main system and identification database.

Referring now in greater detail to the drawings, in which like numerals represent like components throughout the several views, FIG. 1 illustrates a block diagram of the preferred embodiment of the verification system illustrating a check verification unit 10 in communication with a main system 12 which includes an identification database 14. While a check is disclosed as the preferred negotiable instrument to be processed in the present inventive system, other negotiable instruments can be processed in the same manner as disclosed herein. Negotiable instrument, as the term is used herein is defined in Article 3 §104 of the Uniform Commercial Code. An instrument is negotiable if it is: (1) a written instrument signed by the endorser or maker; (2) an unconditional promise to pay a certain amount of money, either on demand or at a future date; and (3) payable to the holder or bearer. Examples of negotiable instruments are checks, bills of exchange, and promissory notes. A check as used herein means a draft, payable on demand and drawn on a bank, or a cashier's or teller's check. This is the customary definition of a check. The preferred embodiment of the check verification unit 10 is comprised of, at least, a check scanner 16 and a biometric data-gathering device, such as fingerprint recording device 18.

Many check scanning devices are known in the art which scan the magnetic ink on the bottom of checks and such devices are commonly used at banks, sometimes referred to as bank "proofing" machines. However, such device alternately includes the capability of video digitization of the check or gathering other characteristics of the negotiable instrument that are useful for comparison.

The fingerprinting device 18 preferably digitizes the fingerprint of a customer at the point of sale for transmission to a remote biometric database. Many devices for digitization and transmission of fingerprints are well known in the art, such as the devices of Digital Biometrics. Other biometric devices such as retinal scanners are alternately used with, or in lieu of, the preferable fingerprint scanner. The check verification unit 10 also preferably includes a card scanner, such as a driver's license scanner 20 which scans information from a driver's license, which is especially useful in states that put information, such as fingerprints, in a computer-readable medium such as a magnetic strip (for example a California license) or a bar code (for example a Georgia license) on the driver's license. When the license contains this information, the check verification unit 10 can perform an initial comparison between the fingerprint device 18 and the device's license scanner 20 for determination of the customer's identity, in addition to or instead of, transmitting biometric data to the biometric database of the main system 12. Finally, the check verification unit 10 preferably includes a signature taking device 22 that allows a customer to write his or her signature on the device and encodes the signature into digital format for transmission. Such transmissions can occur with or separately from the transmission of the check identification and biometric data. There are many devices known in the art which allow a signature to be digitized for storage and comparison, and any of such devices will work satisfactorily in the present inventive system.

The check verification unit 10 is preferably a computer platform which has the capability to receive, digitize and process the incoming data from the devices, shown by block 24, for transmission to a main system 12. The other devices can be integrated with the computer platform of the check verification unit 10, however, the devices can also be independent from the computer platform as long as they are in connection to the check verification unit 10 sufficient to transmit and have received by the unit 10 the relevant data from the devices. The main system 12 is in connection with, at least, a negotiable instrument identification database 14 which at least contains the relevant specific identification data related to various checking and/or credit accounts. The identification database 14 can be a hard drive on the main system 12, computer platform, or other type of memory device located either locally or remotely, but in connection with, the main system 12. Thus, in its most basic form, the present invention solely generates and records identification data of the customer relevant to a single sale and acceptance of check at a point of sale through recordation of the specific check identification and biometric data of the customer at the point of sale, which is then transmitted by the various devices of the check verification unit 10 for recordation. When the simple recordation of the event is effected, it is preferable that the check verification unit 10 output a fingerprint (or other biometric data) for inputting on the specific check or negotiable instrument at the point of sale, shown by output 26, either in actual or digitally encoded form, whereby this identifying characteristic of the person cashing or tendering the check is contained upon the check itself and banks processing the check have the capability to compare that imprinted fingerprint with fingerprints on file for the actual account holders, if necessary. However, the printing of the fingerprint on the check can be alternately used in any embodiment of the present inventive verification system.

Figure 2:
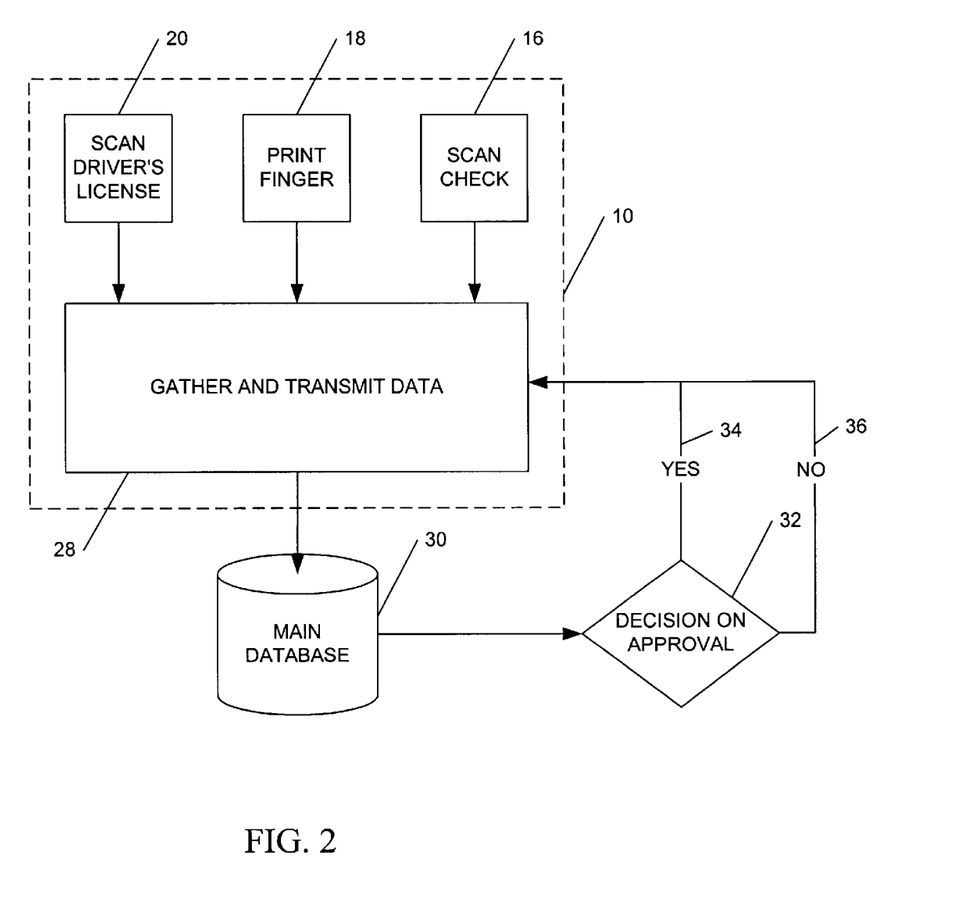
FIG. 2 is a block diagram illustrating an alternate embodiment of the present invention whereby the check verification unit is in communication with a main database which returns an approval decision to the check verification unit.

FIG. 2 illustrates an alternative embodiment of the check verification unit 10 in communication with a main database 30 such that the main database 30 allows the data stream of the check verification unit 10 to be acted upon by decision 32 to determine if the check verification is approved or denied, and then returns the approval decision to the check verification unit 10. In such embodiment, the computer platform receives, processes, and transmits the data of the various devices, shown by block 28, to the negotiable instrument database included in the main database 30, preferably via a phone line or a reserved data line, for a simple comparison step to determine approval.

At the main database 30, the incoming data is compared, either in parallel with or separately with check identification data, with the existing known data for authorized users of accounts, shown by decision 32, and an approval is made as to whether or not to accept the check. Either a yes decision 34 or a no decision 36 on approval is then re-transmitted back to the computer hardware platform 28 of the check verification unit 10. While the check verification unit 10 is shown in communication with a database 30 remotely located thereto, it is not necessary that the main system 12 or the database 30 be located remotely to the check verification unit 10. In fact, the check verification unit 10 and main system 12 can be self-contained at the point of sale whereby the main database, or the check information biometric databases are continually updated within the check verification unit 10 through either a modem or data connection to a master database or through periodic manual updates from storage media such as floppy disks or CD ROMs. In such embodiment, the check verification system is preferably self-contained and includes all the necessary devices for scanning driver's licenses 20, printing fingers 18 (gathering biometric data), or scanning checks 16 (gathering check information data) within one unit comprising the system.

Figure 3:
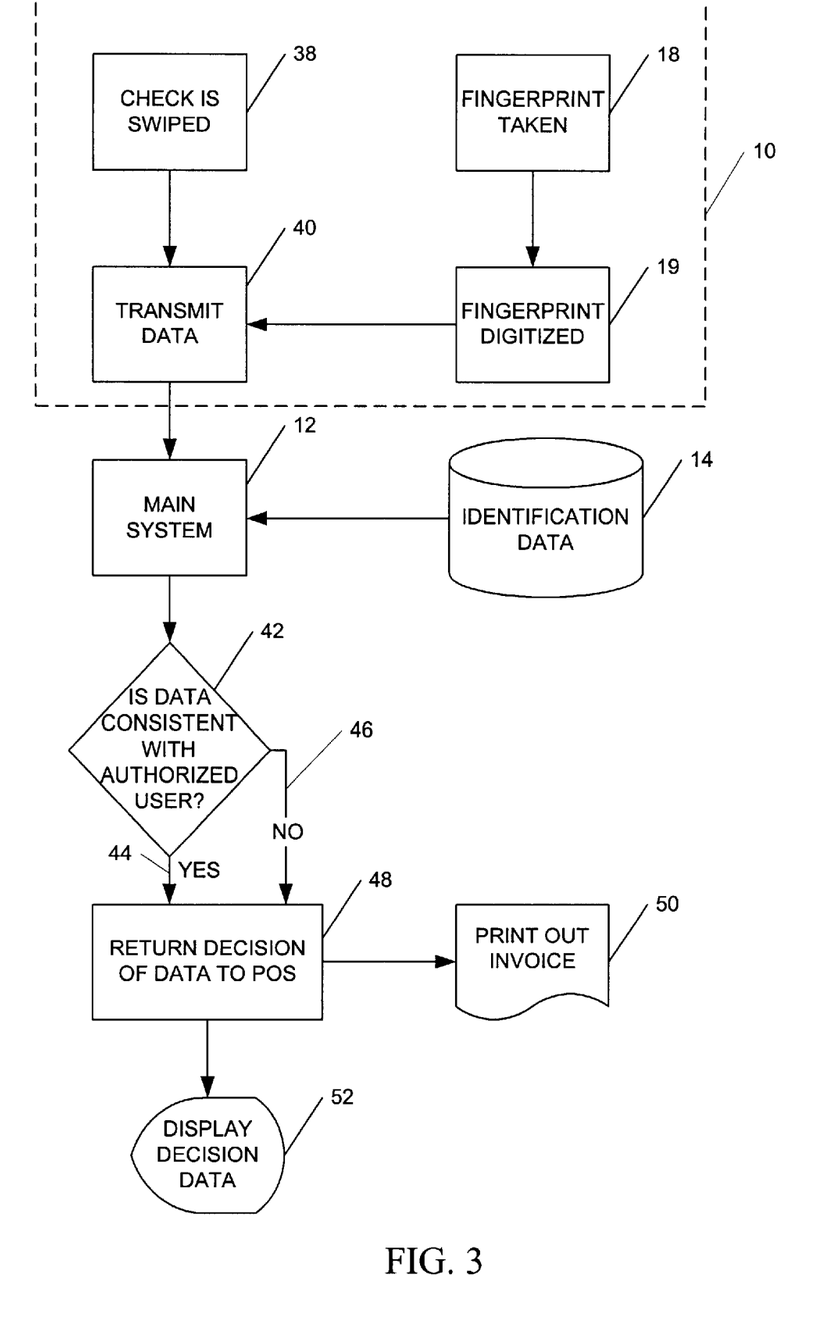
FIG. 3 is a flow chart of an alternate embodiment of the verification system illustrating the check verification unit transmitting the identifying data of a check and a fingerprint to the main system for processing.

FIG. 3 is a flow chart of an alternate embodiment of the verification system showing the check verification unit 10 whereat a check is swiped, shown by block 38, and a fingerprint is taken, shown by block 18, and then the fingerprint is digitized, shown by block 19, and both the check information data and the biometric fingerprint data are unified at the transmitting data platform, shown by block 40, for parallel transmission. The transmitted data then reaches the main system 12 which is in communication with a check and biometric identification database 14 such that a decision is made within the main system 12 in regard to check approval. The main system 12 performs a decision determining if the check information and biometric data are consistent with an authorized user for the account against which the check is drafted, shown by decision 42, whereby a yes decision 44 or a no decision 46 is returned to the point of sale, shown by block 48. Upon return of the data from the main system 12, the data indicative of the decision is displayed, shown by display 52, and/or a hard copy is printed out, shown by document 50, indicative of the decision made, and alternatively, the grounds for acceptance or rejection.

Figure 4:
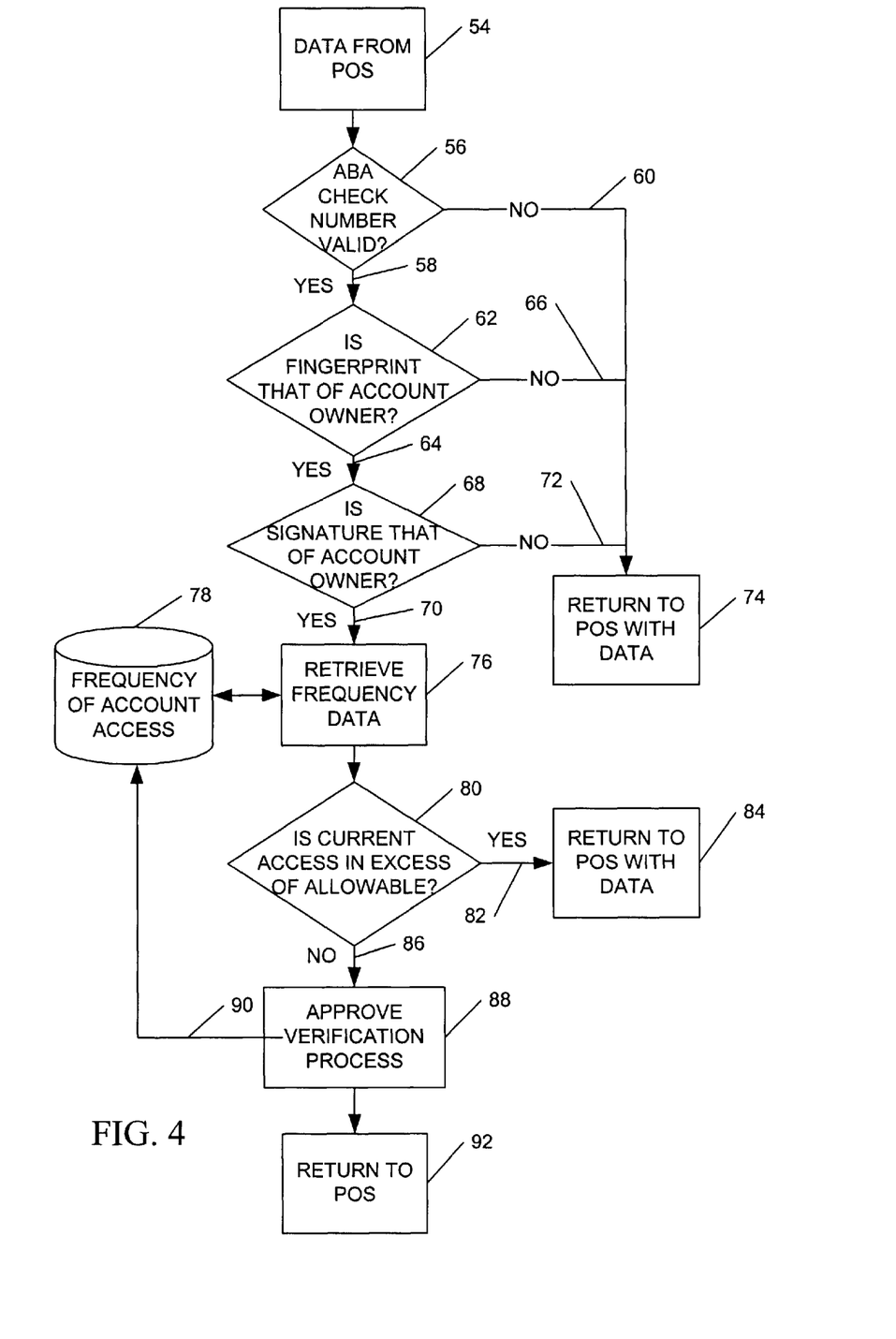
FIG. 4 is a flow chart illustrating the processing of transmitted data by the main system upon receipt of the data from the check verification unit at the point of sale.

The present invention accordingly utilizes an inventive digital process whereby a dataset originates from the point of sale from the check verification unit 10, shown by block 54, and is preferably processed on the main system 12 as shown in the flow chart of FIG. 4. A decision is made as to whether the magnetic check number ("ABA" number) is valid, shown by decision 56, and then a decision is made as to whether the fingerprint (biometric data) is that of the registered account owner, shown by decision 62, and then a decision is made as to whether the signature presented is that of the account owner, shown by decision 68. Affirmative responses to these decisions, shown by yes arrows 58, 64, and 70, preferably allow further processing of the data, and no decisions shown by arrows 60, 66, and 72, preferably effect a return of data to the point of sale indicative that the check approval request is denied, shown by block 74.

Once affirmative responses have been received to decisions 56, 62, and 68, then the data is further processed by accessing a frequency of access database 78 which has information on accounts based upon the numbers of inquiries to the system for a specific account, shown by block 76, and such information is maintained and updated in the frequency of account access database, shown by database 78, which can be either integrated with or remote to the main system 12. Then a decision is made as to whether the current access is in excess of a predetermined allowable amount of access inquires to the system for a specific account, shown by decision 80, and if the current access is in excess of the allowable pre-determined amount, shown by yes arrow 82, then the data is returned to the point of sale indicative that the requested access exceeds the allowable amount, shown by block 84, and thus that approval is denied. Otherwise, if the current access is not in excess of the allowable pre-determined amount, shown by no arrow 86, then the check verification request is approved, shown by block 88.

Upon approval, the information of the approval is transmitted, shown by arrow 90, to the frequency of account access database 78 for updating of the records contained therewithin. The information regarding the approval of the check verification is then returned to the point of sale and check verification unit 10, shown by block 92.

The steps of the processes set forth in FIG. 4 are preferably performed by software being executed on the computer platform comprising the main system 12, located either at the point of sale and integrated with check verification unit 10, or located remotely thereto. One of skill in the art of computer programming can determine from the present disclosure and the flow charts disclosed herein the objects sufficient to write a program for the computer platform sufficient to perform the tasks as disclosed herein.

Figure 5:
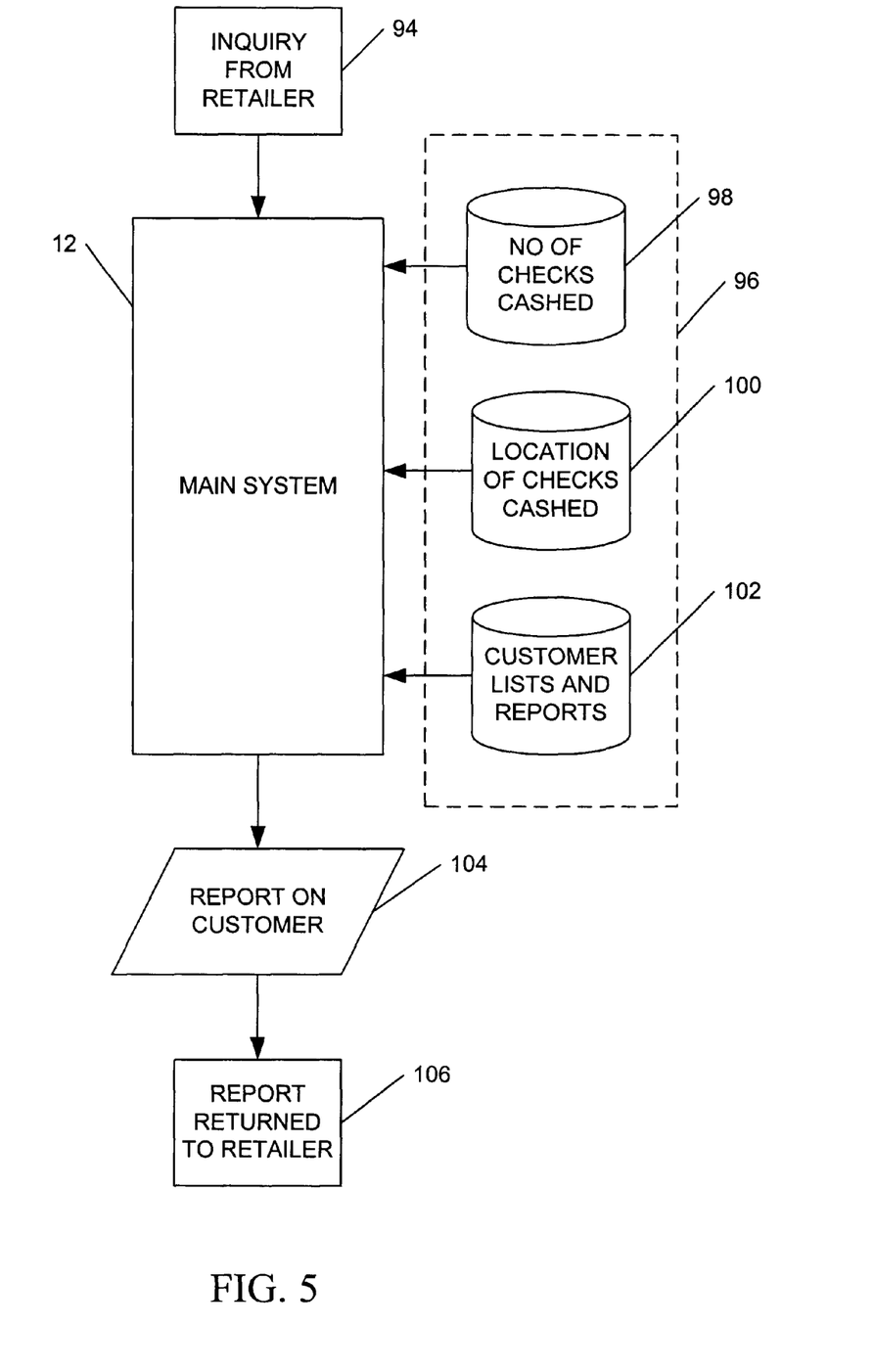
FIG. 5 is a block diagram illustrating the main system generating a customer report based upon receipt of an inquiry from a retailer.

The present invention of the verification system preferably includes the capability to return a report to a retailer upon request, as shown in FIG. 5. As so embodied, an inquiry and/or request is made from a retailer directed towards the main system 12, shown by block 94, which requests a specific report or series of reports. The main system 12 preferably includes access to a variety of databases 96, which preferably includes separate databases comprised of a database indicative of a number of checks cashed for a given account, shown by database 98, locations of checks cashed for a specific account, shown by database 100, and a database containing various information regarding the customers of the account, shown by database 102. The main system 12 selectively accesses and interacts with these databases in response to the inquiry from the retailer 94, and generates a report on the specific customer or customers, shown by processed data 104. The processed data then is returned in report form to the specific retailer, shown by block 106, which made the inquiry and request to generate the report. Such information generated by the verification system can prove highly informative as to customer trends such as drops in frequencies of purchases, customer dissatisfaction, or other trends which can then be effectively targeted by marketing efforts.

Figure 6:
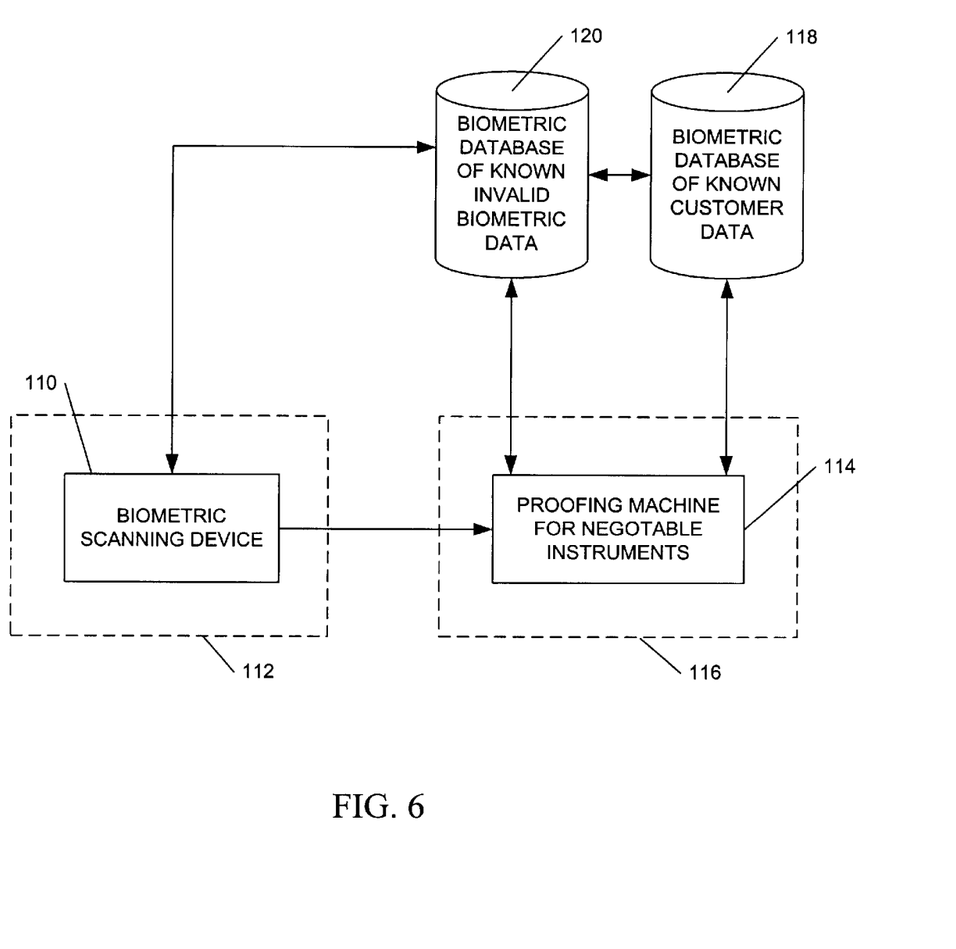
FIG. 6 is a block diagram illustrating a proofing machine interacting with the biometric data scanner at the point of sale, with the interrelation of a first biometric database for known customers and a second biometric database for known invalid data.

The present inventive verification system further provides that after the biometric identification data, such as a fingerprint, has been imprinted on the check, the present invention can alternately be used at a bank in conjunction with the proofing machine to determine if the biometric identification data on the check is that of the account owner. As shown in FIG. 6, the biometric scanning device 110, preferably at the point of sale 112, is sent, either electronically or physically, to the proofing machines for negotiable instruments 114, typically at a bank processing center 116. Currently, checks are typically physically sent to a bank or processing center and the magnetic number of the check physically scanned by the proofing machine 114. Thus, in one embodiment, the biometric data is printed on the check by the biometric scanning device 110 and the printed biometric data is scanned, and thus gathered, in addition to the magnetic number of the check. A comparison step preferably occurs within the proofing machine 114 during the batch processing and scanning of the magnetic numbers of the checks for transfer of funds from the accounts. The biometric data is retrieved and updated from a first biometric database 118 which contains the biometric data for known customers having accounts. The proofing machine 114 also preferably perform a comparison step with a second biometric database 120 containing biometric data for known invalid users who have perpetrated, or attempted to perpetrate, fraudulent activity with regard to tendering negotiable instruments. Databases 118 and 120 can reside on the proofing machine 114, or be located remotely thereto. Such information in biometric database 120 is preferably also accessible by the biometric scanning device 110 at the point of sale 112 for updating and comparing, either separately from or in conjunction with, the proofing machine 114. If the negotiable instrument being compared was tendered fraudulently, the biometric database 120 is useful for determining the perpetrator's actual identity, and comparison between databases 118 and 120 can also be made for identity determination.

While there have been shown a preferred and alternate embodiments of the present invention, it is to be understood that the invention may be embodied otherwise than is herein specifically shown and described, and that within the embodiments, certain changes may be made in the form and arrangement of the parts without departing from the underlying ideas or principles of the present invention of a check verification system set forth in the claims appended herewith.

What is claimed is:

1. A negotiable instrument verification system for use at a location where a negotiable instrument is presented by an individual, comprising:

a negotiable instrument scanning device for scanning and transmitting encoded negotiable instrument information data on the negotiable instrument;

a biometric data device for scanning and transmitting biometric data with the negotiable instrument;

a biometric database for storing biometric data for an authorized user;

a negotiable instrument information database for storing account information for the authorized user;

wherein the biometric data device selectively transmits biometric data to the biometric database for comparison with the biometric data stored for the authorized user to verify the identity of the individual presenting the negotiable instrument; and wherein the negotiable instrument scanning device selectively transmits, either together with or separately from the biometric data, encoded negotiable instrument data to the negotiable instrument information database for comparing the transmitted encoded negotiable instrument information with account information stored in the negotiable instrument information database to determine if the account against which the negotiable instrument is drafted is in condition to satisfy the negotiable instrument.

2. The system of claim 1 further comprising:

a signature scanning device for scanning and encoding signature data received with the negotiable instrument;

a signature database for storing signature data for the authorized user; and wherein the signature scanning device selectively transmits encoded signature data to the signature database for comparison with the signature stored for the authorized user.

3. The system of claim 1 wherein the negotiable instrument is a check.

4. The system of claim 1 wherein the biometric data is fingerprint data.

5. The system of claim 3 wherein the information data is the check number written in magnetic ink on the check.

6. The system of claim 1 wherein the negotiable instrument verification system selectively returns a report on customer usages.

7. The system of claim 1 wherein the biometric data device further selectively prints recorded biometric data on the negotiable instrument.

8. The system of claim 7 wherein the recorded biometric data is a fingerprint.

9. The system of claim 1 wherein the negotiable instrument scanning device and the biometric data device are located remotely from the biometric database and the negotiable instrument information database.

10. A negotiable instrument verification system for use at a location where a negotiable instrument is presented by an individual, comprising:

negotiable instrument information means for scanning and transmitting encoded negotiable instrument information data on the negotiable instrument;

biometric data means for recording and transmitting biometric data received with the negotiable instrument;

a biometric database for storing biometric data for an authorized user;

a negotiable instrument information database for storing account information for the authorized user;

wherein the negotiable instrument information means selectively transmits encoded negotiable instrument information data to the negotiable instrument information database for comparison with account information for the authorized user to verify a condition of the account; and wherein the biometric data means selectively transmits, either together with or separately from the encoded negotiable instrument information data, biometric data to the biometric database for comparison with the biometric data stored for the user to verify the identity of the individual presenting the negotiable instrument.

11. The system of claim 10 further including:

signature scanning means for scanning and encoding signature data received with the negotiable instrument;

a signature database for storing signature data for an authorized user; and wherein the signature scanning selectively transmits, either together with or separately from the negotiable instrument information data and the biometric data, encoded signature data to the signature database for comparison with the signature stored for the authorized user.

12. The system of claim 10 wherein the negotiable instrument is a check.

13. The system of claim 12 wherein the negotiable instrument information data is a check number written in magnetic ink on the check.

14. The system of claim 10 further including report means for transmitting a report detailing customer usage of system.

15. The system of claim 10 further including means for selectively printing the encoded biometric data from the biometric data means in a readable medium on the negotiable instrument.

16. The system of claim 15 wherein the biometric data is a fingerprint; and wherein the biometric data printed on the negotiable instrument is selectively transmitted to the biometric database for comparison with the biometric data stored for the authorized user.

17. A method of verifying the identity of a person attempting to tender a negotiable instrument, and the condition of an account against which the negotiable instrument is drafted, the method comprising the steps of:

obtaining encoded account information from the negotiable instrument;

obtaining biometric data from the person tendering the negotiable instrument;

selectively transmitting the encoded negotiable instrument information to a negotiable instrument information database that stores account information for an authorized user;

comparing the transmitted encoded negotiable instrument information with account information stored in the negotiable instrument information database to determine if the account against which the negotiable instrument is drafted is in condition to satisfy the negotiable instrument;

selectively transmitting the biometric data, either together with or separately from the encoded negotiable instrument information data, to a biometric database that stores biometric information for the authorized user;

comparing the transmitted biometric data with biometric information stored in the biometric database, either separately from or in parallel with the step of comparing the transmitted encoded negotiable instrument information with account information in the negotiable instrument information database, to determine if the person tendering the negotiable instrument is authorized to use the account against which the negotiable instrument is drafted.

18. The method of claim 17, further including the steps of:

obtaining the signature of the person tendering the negotiable instrument;

selectively transmitting the signature information, either together with or separately from the encoded negotiable instrument information and the biometric data, to a signature database that stores signature information for the authorized user;

comparing the transmitted signature information with signature information in the signature database, either separately from or parallel with the step of comparing the encoded negotiable instrument information with account information in the negotiable instrument information database and comparing the biometric data with biometric information in the biometric database, to determine if the signature is that of an authorized user for the account against which the negotiable instrument is drafted.

19. The method of claim 17 further including the step of printing the obtained biometric data on the negotiable instrument in a human or machine readable medium.

20. The method of claim 19 further including the step of transmitting data indicative of whether the person is authorized to use the account to the location where the negotiable instrument information and biometric data are obtained.

21. A negotiable instrument verification system for use with a check processing system, at a location where a negotiable instrument is presented by an individual comprising:

a scanning device for scanning and transmitting data encoded on a negotiable instrument;

a biometric data device for recording and transmitting biometric data that is received with the negotiable instrument;

a first biometric database for storing biometric data for an authorized user;

a second biometric database for storing biometric data for an invalid user;

a negotiable instrument database for storing account information for an authorized user;

wherein the biometric device selectively transmits biometric data to the first biometric database to verify the identity of the individual presenting the negotiable statement; and wherein the scanning device selectively transmits the encoded data to the negotiable instrument database to verify the condition of the account.

22. The negotiable instrument verification system for use with a check processing system of claim 21 wherein the encoded data is magnetic ink character recognition data that is printed on the negotiable instrument.

23. The negotiable instrument verification system for use with a check processing system of claim 21 wherein the biometric device digitizes a representation of the biometric data received with the negotiable instrument and prints the digitized biometric data directly on the negotiable instrument.

24. The negotiable instrument verification system for use with a check processing system of claim 21 wherein the biometric data is transmitted to the second biometric database to determine if the individual presenting the negotiable instrument is an invalid user.

25. The negotiable instrument verification system for use with a check processing system of claim 21 further comprising:
   a second scanning device for scanning and encoding signature data received with the negotiable instrument;
   a signature database for storing signature data for the authorized user;
   wherein the second scanning device selectively transmits encoded signature data to the signature database to determine if the signature data was received from an authorized user.

* * * * *